Aug. 27, 1946.    C. J. STAHLY    2,406,479
JUICE EXTRACTOR
Filed Sept. 21, 1944
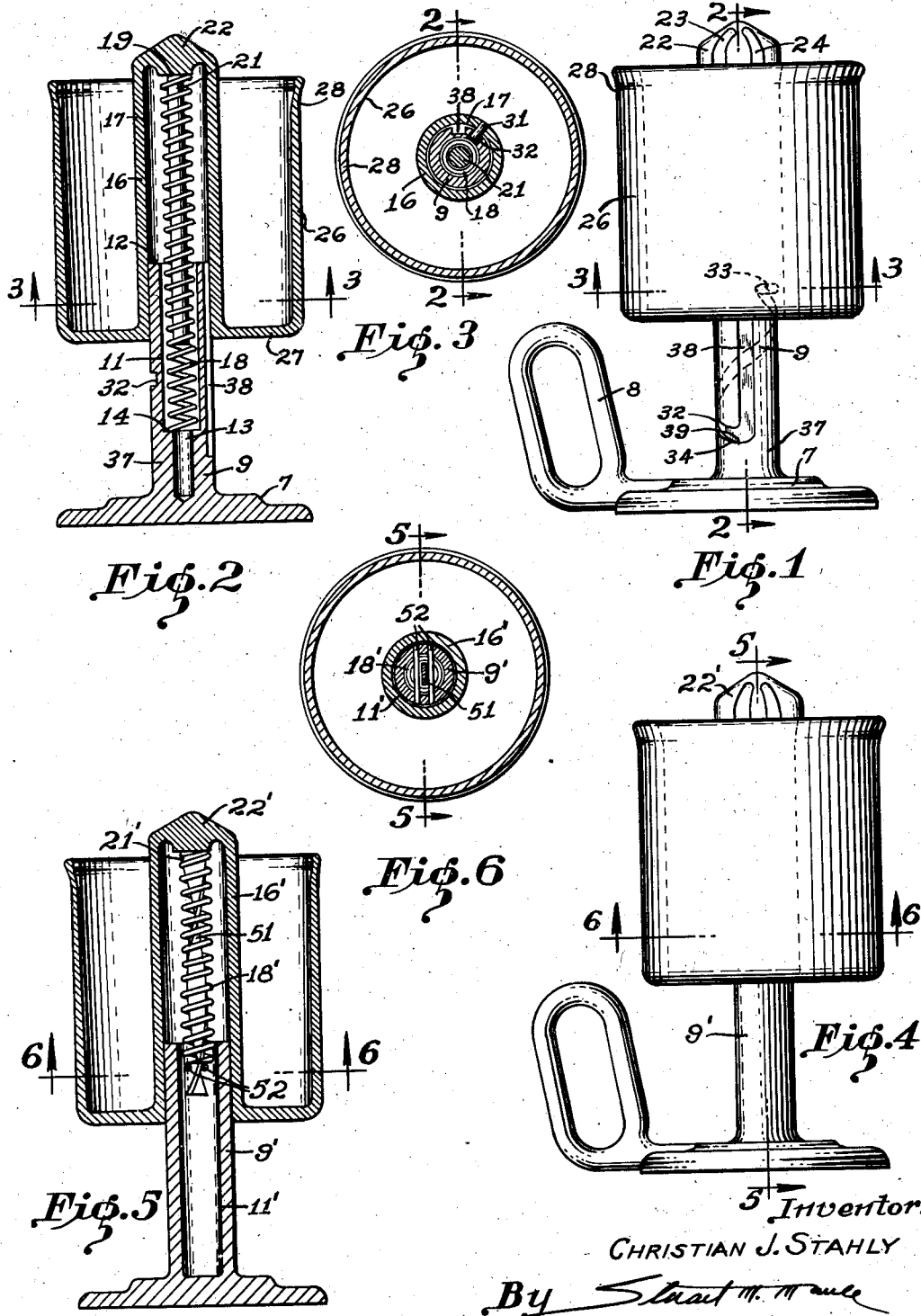
Inventor.
CHRISTIAN J. STAHLY
By  Stuart M. Maule
    Attorney Patented Aug. 27, 1946

2,406,479

UNITED STATES PATENT OFFICE 2,406,479

JUICE EXTRACTOR

Christian J. Stahly, El Monte, Calif.

Application September 21, 1944, Serial No. 555,099

8 Claims. (Cl. 146—3)

This invention relates to vegetable and meat cutters and comminuters and more particularly to devices for extracting the juice from citrus fruit.

An object of the present invention is to provide a manually operable device for extracting the juice from citrus fruit, which is entirely self-contained and which is automatic to the extent that the rotary motion necessary for operation of the reamer portion of the device is derived from the interconnection between the reamer and the pedestal upon which it is reciprocably mounted so that the only action necessary on the part of the operator in using the device is to place a section of a citrus fruit upon the reamer and then press it downward whereupon the reamer will rotate, thus causing its fluted surface so to tear open the cellular construction of the citrus fruit that the juice thereof will be liberated.

A further object is to provide an improved and simplified type of construction for a citrus reamer whereby exclusion of the juice from all working parts of the mechanism of the device is assured, without the necessity of employing packing or any such tight joints between relatively movable parts of the device that their freedom of movement is impaired.

A more detailed object in this connection is to provide a citrus fruit juice extractor of the general class described wherein the cup or bowl for gathering the juice as it is liberated from the fruit sections is carried by the reamer portion of the device which extends upwards from and is in fluid-tight engagement with the bottom of the cup, with the result that all possibility of leakage of juice between the cup and the reamer is precluded.

A further object is to provide a citrus fruit juice extractor as described, of simple and inexpensive construction and composed of a minimum number of parts which are so interconnected that they will remain in assembled, operative position under normal circumstances, but can readily be disassembled so as to permit thorough cleansing of the entire structure.

The invention possesses other objects and valuable features, some of which, with those enumerated, will be set forth in the following description of the preferred embodiment of my invention illustrated in the drawing accompanying and forming a part of the specification. It is to be understood that I do not limit myself to the showing made by said drawing and description but that I may adopt variations of the preferred form within the scope of my invention as defined by the claims.

Referring to the drawing:

Figure 1 is a view in side elevation of a citrus fruit juice extractor embodying the principles of the present invention.

Figure 2 is a vertical, medial sectional view taken upon the lines 2—2 of Figures 1 and 3, with the direction of view as indicated.

Figure 3 is a horizontal sectional view taken upon the lines 3—3 of Figures 1 and 2, with the direction of view as indicated.

Figure 4 is a view in side elevation of a modified form of juice extractor embodying the principles of the present invention.

Figure 5 is a vertical, medial sectional view, the plane of section being indicated by the lines 5—5 of Figures 4 and 6, and the direction of view by the arrows.

Figure 6 is a transverse, horizontal sectional view, the plane of section being indicated by the lines 6—6 of Figures 4 and 5, and the direction of view by the arrows.

Referring first to that embodiment of the juice extractor of my present invention illustrated in Figures 1 to 3, inclusive, I have provided a base 7 preferably relatively thin and having a handle 8 rigid therewith at one side and preferably extending upwards to such a height thereabove that it affords the utmost convenience in holding the base 7 stationary while the device is in use. An upstanding pedestal or guide 9 of cylindrical form is preferably formed integrally with the base. The guide 9 is of tubular form, having a bore 11 extending downwards from the upper end 12 thereof through the major portion of the guide's length. A counterbore 13 extends downwards from the bottom 14 of the bore 11 through the remaining length of the guide 9.

A sleeve 16, the bore 17 of which is of slightly greater diameter than the outside diameter of the guide 9, is reciprocably mounted upon the guide 9 in telescopic relation therewith. A coil spring 18 under compression between the bottom 14 of the bore 11 and a shoulder 19 on a pin 21 rigid with and disposed axially within the sleeve 16, continually urges the sleeve 16 towards the upper limit of its reciprocatory movement upon the guide 9. The pin 21 serves to retain the spring 18 with its axis substantially straight, i. e., the pin 21 prevents the spring 18 from buckling within the bores 17 and 11. The lower end of the pin 21 is receivable within the counterbore 13 when the sleeve 16 is at the lower end of its stroke.

The upper end of the sleeve 16 is closed as by a preferably integral cap 22, thus precluding all possibility of the entrance of juice within the bore 17 through the upper end of the sleeve 16. Preferably the upper surface of the cap 22 is tapered and is fluted, as indicated at 23, with the flutings extending downwards for a material distance along the cylindrical exterior surface of the sleeve 16 below the cap 22, as indicated at 24.

A cup or bowl 26 is provided upon the lower end of the sleeve 16 to collect juice as it is liberated from a section of fruit being reamed by the flutings 23 and 24; and it is principally in the manner in which this cup 26 is arranged that the juice extractor of the present invention differs from those of more conventional construction. Instead of being secured to the base of the device in accordance with the design of devices of this nature now in common use, the cup 26 is rigid with, and preferably is formed integrally upon, the lower end of the sleeve 16. The bottom wall 27 of the cup 26 is preferably flat and of circular form, extending radially outwards in all directions from the bottom of the sleeve 16 with respect to which it is coaxially disposed. A relatively high rim or side wall 28 extends upwards from the outer, peripheral edge of the bottom wall 27; and preferably the rim 28 is substantially straight, i. e., possessed of relatively little, if any, flare so as to minimize the tendency for juice contained within the cup to be thrown out of the cup by centrifugal action while the cup is rotating.

The means for imparting rotary motion to the reamer concurrently with reciprocatory motion of the sleeve 16 upon its supporting guide 9 comprises a pin 31 rigid with the sleeve 16 and extending radially inwards from the bore 17 thereof to seat slidably within a helical slot or groove 32 in the outer cylindrical surface of the guide 9. Preferably the upper and lower ends 33 and 34, respectively, of the helical groove are spaced a material distance from the top and bottom ends 12 and 37, respectively, of the guide 9, and the pitch of the helix described by the groove 32 is such that the groove extends throughout slightly less than 360° of the circumference of the guide 9. Accordingly, a vertical groove 38 clears the upper end 33 of the helical groove 32 (Figure 1) even though the lower end of the vertical groove 38 is spaced slightly from the lower end 34 of the helical groove 32 by a short horizontal groove 39 which establishes communication between the lower ends of the grooves 32 and 38. Owing to the fact that the upper end 33 of the helical groove 32 terminates short of the upper end 12 of the guide 9, it serves to limit upward motion of the sleeve 16 so as to prevent inadvertent complete removal of the sleeve from the guide. However, when it is desired to separate these parts as for washing, it is necessary merely to push the sleeve 16 and the parts carried thereby downward to the lower limit of the stroke as determined by engagement of the pin 31 with the lower end 34 of the groove 32, and thereafter rotate the sleeve 16 in a counterclockwise direction, as viewed upon Figure 3, far enough to cause the pin 31 to move the length of the horizontal slot 39 and thus enter the lower end of the vertical slot 38 whereupon the sleeve and the parts associated therewith can be lifted straight off the guide 9. In order to replace the parts, the sleeve is first placed upon the upper end of the guide 9 in such position that the pin 31 enters the upper end of the vertical slot 38, it being understood that the spring 18 is in position with its lower end within the bore 11 of the guide 9. Then the sleeve 16 is pressed downwards, compressing the spring 18 until the pin 31 has passed the entire length of the vertical slot 38. The sleeve then is turned clockwise as viewed upon Figure 3 until the pin 31 enters the lower end of the helical groove 32 whereupon the spring 18 is permitted to push the sleeve upwards with the pin 31 moving in the helical groove 32.

Owing to the fact that the upper end of the sleeve 16 is sealed by the cap 22 and that the sleeve 16 establishes a fluid-tight seal at its lower end with the bottom wall 27 of the juice-gathering cup 26, the possibility that juice from the fruit being removed can enter the bore 17 of the sleeve 16 is minimized. Hence, fouling of the working portions of the device by accumulated juice and contamination of the juice being extracted are substantially completely avoided, in spite of the fact that the fit between the relatively movable portions of the device is so loose as to insure freedom of operation. It will be readily understood that juice extracted from fruit being reamed by the fluted cap 22 will collect within the cup 26. However, owing to the fact that the side walls 28 of the cup 26 are substantially vertical throughout the entire length, the danger of the juice being thrown from the cup by centrifugal action resulting from its rotary motion is minimized. Furthermore, the cylindrical wall 28 of the cup is smooth and is arranged concentrically with the sleeve 16, this being another factor which tends to minimize turbulence of the juice collected within the cup 26 and thus prevents its being accidentally splashed therefrom.

Figures 4, 5, and 6 disclose a slightly modified form of construction which is similar in all respects to that already described except that the means interconnecting the movable and stationary portions of the device and for imparting rotary motion to the sleeve 16' and the reamer cap 22' are of a different nature. In this modification the pin 21' rigid with and extending axially downwards from the cap 22' is substantially flat throughout the major portion 51 of its length, and is of helical form, i. e., each lateral edge of the flat portion 51 describes a spiral. Such a helical strip can be formed economically by twisting a piece of flat strip stock. However, if a more accurate construction is desired, it can be cut in much the same manner as a screw thread is cut in a lathe. A pair of spaced, parallel pins 52 rigid with the guide 9' extend across the bore 11' thereof adjacent the upper end of the guide 9' with the helical portion 51 of the pin 21' slidably disposed therebetween. Accordingly, when the sleeve 16' and the parts carried thereby are pressed downwards upon the guide 9' against the action of the coil spring 18' engagement of the helical strip 51 with the pins 52 will impart rotary motion to the sleeve 16' and to reaming head 22' so as to effect efficient extraction of juice from a section of fruit pressed against the head 22'.

I claim:

1. In a manually operable juice extractor, a base, a cylindrical guide rigid therewith and extending upward therefrom, a sleeve mounted on said guide for reciprocatory motion in telescopic relation therewith, means interconnecting said sleeve and guide for rotating said sleeve with respect to said guide concurrently with relative telescopic movement thereof, spring means urging said sleeve upwards on said guide, reaming means on the upper end of said sleeve, and a juice-gathering cup carried by said sleeve below said reaming means, 2. In a manually operable juice extractor, a base, a cylindrical guide rigid therewith and extending upward therefrom, a sleeve closed at its upper end and mounted on said guide for reciprocatory motion in telescopic relation therewith, means interconnecting said sleeve and guide for rotating said sleeve with respect to said guide concurrently with relative telescopic movement thereof, spring means urging said sleeve upwards on said guide, reaming means on the upper end of said sleeve, and a juice-gathering cup carried by said sleeve below said reaming means.

3. In a manually operable juice extractor, a base, a cylindrical guide rigid therewith and extending upward therefrom, a sleeve mounted on said guide for reciprocatory motion in telescopic relation therewith, means interconnecting said sleeve and guide for rotating said sleeve with respect to said guide concurrently with relative telescopic movement thereof, spring means urging said sleeve upwards on said guide, reaming means on the upper end of said sleeve, and a juice-gathering cup making fluid-tight engagement with said sleeve below said reaming means.

4. In a manually operable juice extractor, a base, a cylindrical guide rigid therewith and extending upward therefrom, a sleeve mounted on said guide for reciprocatory motion in telescopic relation therewith, means interconnecting said sleeve and guide for rotating said sleeve with respect to said guide concurrently with relative telescopic movement thereof, spring means urging said sleeve upwards on said guide, reaming means on the upper end of said sleeve, and a juice-gathering cup making fluid-tight engagement with said sleeve below said reaming means, said cup being of substantially circular cross section and disposed coaxially with respect to said sleeve.

5. In a manually operable juice extractor, a base, a cylindrical guide rigid therewith and extending upward therefrom, a sleeve mounted on said guide for reciprocatory motion in telescopic relation therewith, means interconnecting said sleeve and guide for rotating said sleeve with respect to said guide concurrently with relative telescopic movement thereof, said interconnecting means comprising a pin rigid with and extending radially inwards from said sleeve, the inner end of said pin being slidably disposed within a helical groove in the cylindrical surface of said guide, spring means urging said sleeve upwards on said guide, reaming means on the upper end of said sleeve, and a juice-gathering cup carried by said sleeve below said reaming means.

6. In a manually operable juice extractor, a base, a cylindrical guide rigid therewith and extending upward therefrom, a sleeve mounted on said guide for reciprocatory motion in telescopic relation therewith, means interconnecting said sleeve and guide for rotating said sleeve with respect to said guide concurrently with relative telescopic movement thereof, said interconnecting means comprising a pin rigid with and extending radially inwards from said sleeve, the inner end of said pin being slidably disposed within a helical groove in the cylindrical surface of said guide, spring means urging said sleeve upwards on said guide, reaming means on the upper end of said sleeve, said helical groove terminating short of the upper end of said guide to limit upward movement of said sleeve, and a juice gathering cup carried by said sleeve below said reaming means.

7. In a manually operable juice extractor, a base, a cylindrical guide rigid therewith and extending upward therefrom, a sleeve mounted on said guide for reciprocatory motion in telescopic relation therewith, means interconnecting said sleeve and guide for rotating said sleeve with respect to said guide concurrently with relative telescopic movement thereof, said interconnecting means comprising a pin rigid with and extending radially inwards from said sleeve, the inner end of said pin being slidably disposed within a helical groove in the cylindrical surface of said guide, spring means urging said sleeve upwards on said guide, reaming means on the upper end of said sleeve, said helical groove terminating short of the upper end of said guide to limit upward movement of said sleeve, said guide having a substantially horizontal groove communicating with said helical groove adjacent the lower end thereof, and a groove extending upward from the top of said guide into communication with said horizontal groove at a point thereon spaced from said helical groove, and a juice-gathering cup carried by said sleeve below said reaming means.

8. In a manually operable juice extractor, a base, a tubular guide rigid therewith and extending upward therefrom, a sleeve mounted on said guide for reciprocatory motion in telescopic relation therewith, means interconnecting said sleeve and guide for rotating said sleeve with respect to said guide concurrently with relative telescopic movement thereof, said interconnecting means comprising means providing a helix rigid with the upper end of said sleeve and extending downwards coaxially thereinside and guide means rigid with said tubular guide within the bore thereof in sliding engagement with said helix, spring means urging said sleeve upwards on said guide, reaming means on the upper end of said sleeve, and a juice-gathering cup carried by said sleeve below said reaming means.

CHRISTIAN J. STAHLY.